United States Patent Office 2,809,183
Patented Oct. 8, 1957

2,809,183
METHOD OF INTERPOLYMERIZING ETHYLENE MONOMERS WITH POLYESTERS CONTAINING ETHYLENE GROUPS USING DIHYDROXY MALEIC ACID AND ESTERS THEREOF AS ACCELERATORS

Alfred R. Bader, Milwaukee, and Gordon J. Mirr, Tomahawk, Wis., assignors to Pittsburgh Plate Glass Company, Allegheny County, Pa.

No Drawing. Application October 21, 1954,
Serial No. 463,816

9 Claims. (Cl. 260—45.4)

This invention relates to accelerators of interpolymerization of mixtures of monomers containing $>C=CH_2$ groups and polyesters of polyhydric alcohols and alpha-beta ethylenic dicarboxylic acids and it has particular relation to the use as accelerators of interpolymerization in the foregoing mixtures, of dihydroxy alpha-beta ethylenic dicarboxylic acids.

It has heretofore been suggested to interpolymerize mixtures of monomers, such as styrene, containing $>C=CH_2$ groups and polyesters of glycols and alpha-beta ethylenic dicarboxylic acids, such as maleic acid or fumaric acid, by heating the mixture in the presence of a free radical initiator, e. g., a peroxidic material such as benzoyl peroxide. The products are thermoset resins of good hardness and other desirable properties. One advantage of such process resides in the fact that clear, hard, thermoset resins can be so obtained even at atmospheric pressures. However, the operation does require the application of rather elevated temperatures usually over a substantial period of time. Interpolymerizable mixtures of the foregoing type have been successfully employed in the preparation of clear, thermoset castings and in the preparation of laminates and other bodies comprising reinforcements of fibrous materials, such as fabrics or mats of fibers of glass or other materials. The fibrous material may be impregnated with the interpolymerizable mixture or the mixture may be applied as a surface coating, or both methods of application may be employed. The mixture may then be cured to hard, thermoset state.

Small amounts of saturated carboxylic acids containing hydroxyls but being non-ethylenic and being represented by malic acid, tartaric acid, and citric acid have also been incorporated into the foregoing mixtures for purposes of retarding or preventing the attack of the mixture of the resultant resin on copper or alloys thereof.

This invention is based upon the surprising discovery that dihydroxy alpha-beta ethylenic dicarboxylic acids and esters thereof are powerful accelerators of polymerization in the foregoing mixtures, even at relatively low temperatures and are adapted to bring about gelation and even substantially complete cure without substantial added heat. Presumably the etheylenic group has an important effect on the behavior of acid or its esters. Apparently it is especially effective as an activator of free radical catalysts and probably assists in transmitting free radicals. The invention however, is not dependent upon the soundness of this, or other explanation.

Dihydroxymaleic acid or its esters is presently preferred as the accelerator under the provision of the present invention. Dihydroxymaleic acid is understood actually to be dihydroxyfumaric acid of the probable formula:

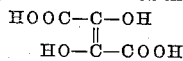

(See J. A. C. S., 75, 1953, page 6244.) However, conventional terminology has been retained in referring to the compound in this specification. It is readily and economically prepared in good yield by the oxidation of tartaric acid with hydrogen peroxide. Esters thereof preferably are of monohydric alcohols, which alcohols may contain from 1 to 6 carbon atoms.

The art of manufacturing resins comprising monomers containing the $>C=CH_2$ group and polyesters of dihydric alcohols and alpha-beta ethylenic dicarboxylic acids has been extensively developed and many commercial examples of such materials are now available upon the market. It will be recognized that substantially any of the commercial, or non-commercial, interpolymerizable mixtures of the foregoing type may be treated with dihydroxy alpha-beta ethylenic dicarboxylic acids and esters thereof in the practice of the present invention.

Monomer components containing the $>C=CH_2$ group and being adapted for use in the mixtures are represented by such compounds as styrene, divinylbenzene, vinyltoluene, saturated esters such as methyl methacrylate, methyl acrylate, acrylonitrile, and others too numerous to enumerate. Many examples of such monomers are listed in the prior patents, such as Parker, U. S. Patent 2,593,787 and the patents mentioned therein.

Alpha-beta ethylenic dicarboxylic acids suitable for use in the formation of polyesters which may be employed in the practice of the invention include: maleic acid, fumaric acid, aconitic acid, mesaconic acid, citraconic acid, ethylmaleic acid, pyrocinchoninic acid, xeronic acid, itaconic acid and many others. The alpha-beta ethylenic dicarboxylic acids are also often mixed with substantial proportions of non-ethylenic dicarboxylic acids, such as phthalic acid, terephthalic acid, tetrachlorophthalic acid, succinic acid, adipic acid, suberic acid, azelaic acid, sebacic acid, dimethylsuccinic acid, and the various chlorinated derivatives of the above acids where all of the carbon to carbon bonds are single or are benzenoid double bonds in a single ring. Where non-ethylenic dicarboxylic acid is employed, the proportions thereof may vary within a range of about 0.25 to 10 or 12 moles with respect to the alpha-beta ethylenic dicarboxylic acid component.

Glycols suitable for use in the preparation of polyesters and which can be employed in the practice of the invention, comprise ethylene glycol, diethylene glycol, triethylene glycol, polyethylene glycol, dipropylene glycol, 1,2-propylene glycol, 1,3-propanediol, butylene glycol. Any of these glycols in substantially stoichiometric amounts or in slight excess, e. g., 5 percent or 10 percent excess, may be reacted with any of the foregoing alpha-beta ethylenic dicarboxylic acids or mixtures of the same with the non-ethylenic dicarboxylic acids, to provide useful polyesters. The esterification reaction in the preparation of the polyesters comprises cooking the glycol component and the dicarboxylic acid component or components together at a temperature sufficient to evolve water. The reaction is continued until all water ceases to evolve and a satisfactory acid number, e. g., one below about 50 or 60, is attained. In no event is the action continued until insoluble products are obtained.

The vinylic monomer component of the interpolymerizable mixture usually will be employed in a proportion of about 10 to 60 percent by weight upon the basis of the total composition and mixtures containing 20 to 40 or 50 percent by weight of monomer are usually preferred.

The polyester and the monomer components preferably are mixed while the polyester component is hot, e. g., at a temperature of about 100° C. to 150° C. Usually at elevated temperatures, such as are employed in mixing the polyester and monomer, the mixture may tend to gel rapidly. In order to avoid premature gelation during the formation and subsequent storage of the mixtures, it is customary to add a gelation inhibitor, of which, a large number are recognized. Quaternary ammonium compounds, such as trimethyl benzyl ammonium chloride, or triethyl benzyl ammonium chloride, or the other quaternary ammonium salts disclosed in the foregoing Parker patent are successful as gelation inhibitors in the uncatalyzed mixtures above described. An appropriate amount, e. g., 0.001 to about 5.0 percent, of such gelation inhibitor may be incorporated into the interpolymerizable mixture. Preferably the addition is to one of the components before the two are mixed. For example, the quarternary ammonium salts may successfully be added to the hot polyester, the latter being at a temperature of about 100° C. or 150° C. Other gelation inhibitors which may be used comprise tertiary butyl catechol, 3-isopropyl catechol and quinone or hydroquinone. Mixtures of phenolic inhibitors, such as the catechols or hydroquinone, and the quaternary ammonium salts as disclosed in the foregoing Parker Patent 2,593,787 may also be employed. Phenolic inhibitors may be cooked into the polyester, if desired. In the absence of catalysts, or accelerators, the mixtures are stable for long periods of time. When the mixtures are to be used, catalysts and/or accelerators are added in accordance with the present invention.

While dihydroxymaleic acid or its esters, as employed in the present invention, are susceptible of use without added peroxidic catalysts and in course of time will effect an adequate cure of the interpolymerizable mixtures without them, it is usually desirable to employ one of the conventional free radical initiator type catalysts, such as benzoyl peroxide, cumene hydroperoxide, tertiary butyl hydroperoxide, or the peroxide of methyl ethyl ketone in combination therewith. The combination, over all, is much more effective than either taken singly.

Dihydroxymaleic acid and its esters are effective as a promoter of gelation and curing of the interpolymerizable mixtures in a relatively broad range of proportions. For example, a range of about 0.01 to 1 or 2 percent by weight based upon the interpolymerizable mixture is suggested. Where a free radical initiator is employed, the amount thereof naturally will vary, dependent upon the activity of the catalytic agent, the temperature employed in the interpolymerization and other factors. In event that benzoyl peroxide is employed as the free radical initiator or catalyst, a proportion of about 0.1 to 5 percent by weight based upon the interpolymerizable mixture is suggested as being effective. The free radical initiator preferably is added shortly prior to the time of cure of the mixture. The dihydroxymaleic acid or ester may be added approximately concurrently with or subsequent to the free radical initiator.

It will be appreciated that dihydroxymaleic acid is a solid material and for purposes of promoting ease of incorporation into an interpolymerizable mixture of a polyester of an alpha-beta ethylenic dicarboxylic acid with a monomer, such as styrene, it is often desirable to dissolve the same in an appropriate solvent, such as an ether, e. g., monoethyl ether of ethylene glycol. Naturally other solvents which are non-reactive with respect to the interpolymerizable mixture may be employed. Application of the principles of the invention is illustrated by the following examples:

*Example I*

In accordance with this example, a polyester component which comprises equal moles of maleic acid and phthalic acid esterified with propylene glycol was employed. The polyester in a ratio of 2 parts by weight was mixed with 1 part by weight of styrene. The mixture was stabilized against premature gelation by means of 0.0025 part by weight based upon the polyester components of hydroquinone, which in this instance was cooked into the polyester component. The foregoing mixture, in the absence of catalysts or accelerators, was relatively stable and could be stored for long periods of time at room temperature without any substantial tendency to gel or set up.

In order to prepare an interpolymerizable mixture suitable for use in forming castings or in forming laminates, for example by coating or impregnating fabrics and mats of glass fibers, the foregoing interpolymerizable mixture was catalyzed with a free radical initiator, namely benzoyl peroxide in an amount of 1 percent by weight. One sample was set aside as a control. A series of three sets of additional samples of the benzoyl peroxide catalyzed material was prepared and dihydroxymaleic as a 1 percent solution in the monoethyl ether of ethylene glycol was added in predetermined amount to each sample.

Tests were conducted upon the samples of interpolymerizable mixture which involved determination of the so-called "tank life." That is, the length of time in hours required for the catalyzed samples to gel.

Also, so-called L. P. E. tests were conducted. The latter tests involved filling 16 millimeter test tubes to a depth of about 3 inches with the material to be tested, inserting a thermocouple in the sample of material in the tube, inserting the tube in a bath at a temperature of 180° F. and determining the time in minutes required for the interpolymerizable mixture to attain maximum temperature due to exothermal rise. The time in minutes required is the so-called L. P. E. value.

The data for these several tests are tabulated as follows:

| Dihydroxymaleic, Percent on Mixture | L. P. E. In Mins. | Peak Temp., °F. | Tank Life in Hours at— | |
|---|---|---|---|---|
| | | | 100° F. | 77° F. |
| 0 (Control) | 6.2 | 340 | 340 | 404 |
| 0.03 | 4.0 | 365 | 1 | 1.5 |
| 0.06 | 3.7 | 325 | 0.5 | 0.75 |
| 0.09 | 3.4 | 345 | 0.5 | 0.75 |

It will be apparent that the interpolymerizable mixtures containing dihydroxymaleic acid have a shorter L. P. E. value and therefore, cure more rapidly than corresponding mixtures containing benzoyl peroxide without dihydroxymaleic acid. The storage life of the mixtures containing dihydroxymaleic acid is also much shorter than that of the corresponding mixtures which are free of dihydroxymaleic acid.

These mixtures can be employed in forming castings and laminates where a very short curing cycle is desirable. One convenient field for such application would involve use as a repair agent for laminates such as are employed in the manufacture of boats, the hulls of which are formed of interpolymer of an alpha-beta ethylenic dicarboxylic acid polyester and an alpha-beta ethylenic monomer which mixture is reinforced with fibrous material, such as glass fibers. Small amounts of the interpolymerizable mixture can be applied as mending material to ruptures in the original structure and quickly cured, with or without application of heat. The interpolymerizable mixtures might also be employed as media for the embedment of perishable objects, such as biological specimens which cannot long withstand elevated temperatures such as are commonly employed in the curing of casting resins. Many other fields of use are available.

*Example II*

In accordance with this example, ethyl dihydroxymaleate was employed as accelerator along with 1 percent by weight based upon the interpolymerization of benzoyl peroxide as a free radical initiator. The interpolymerizable mixture was the same as that disclosed in Example I. The mixtures were then subjected to the same series of tests employed in Example I and the results were as follows:

| Ethyl Dihydroxymaleate, Percent on Mixture | L. P. E. In Mins. | Peak Temp., °F. | Tank Life in Hours at— | |
|---|---|---|---|---|
| | | | 100° F. | 77° F. |
| 0.015 | 2.8 | 340 | 1 | 17 |
| 0.03 | 2.2 | 390 | | 0.5 |
| 0.06 | 2.0 | 395 | | 0.5 |

The mixtures containing benzoyl peroxide and dihydroxymaleate as a pair could be cast and cured at temperatures in a range of 70° F. to 250° F. to provide hard, durable bodies of desired form. Fibrous sheets and bats could be coated or impregnated with the material and cured to provide reinforced bodies such as airplane or vehicle panels and many other bodies.

*Example III*

In this example, the same interpolymerizable components were employed as in Example I; but the benzoyl peroxide as the free radical initiator was replaced by 1 percent by weight of the peroxide of methyl ethyl ketone in solution in 60 percent by weight based upon the mixture of dimethylphthalate. The same tests were conducted upon interpolymerizable mixtures of this material containing dihydroxymaleic acid as were conducted in Example I. The results of the several tests are as follows:

| Dihydroxymaleic, Percent on Mixture | L. P. E. In Mins. | Peak Temp., °F. | Tank Life in Hours at— | |
|---|---|---|---|---|
| | | | 100° F. | 77° F. |
| 0.015 | 6.67 | 300 | 1 | 2 |
| 0.03 | 6.0 | 295 | | 0.3 |
| 0.06 | 6.5 | 290 | 0.75 | |

The material was a useful casting and laminating material and could be cured in the temperature ranges of 70° F. to 250° F.

*Example IV*

In this example the interpolymerizable mixture was the same as that of Example III except that the dihydroxymaleic acid was replaced by ethyl dihydroxymaleate. The results of the several tests are tabulated as follows:

| Dihydroxymaleate, Percent on Mixture | L. P. E. In Mins. | Peak Temp., °F. | Tank Life in Hours at 100° F. |
|---|---|---|---|
| 0 (Control) | 6.2 | 381 | 2 |
| 0.03 | 4.7 | 300 | 0.75 |
| 0.06 | 4.3 | 285 | 0.75 |

The mixtures containing the peroxide of methyl ethyl ketone as a free radical initiator and ethyl dihydroxymaleate as an accelerator, could be formed and cured into useful bodies of wide variety.

*Example V*

The interpolymerizable mixture of this example was similar to that of Example I, except that benzoyl peroxide was replaced by 1 percent by weight based upon the interpolymerizable mixture of cumene hydroperoxide. Instead of determining L. P. E. value, the gel time which is the time in seconds required for the catalyzed mixture at 180° F. to gel to such degree that a sample in a tube can be lifted by a thermometer inserted in the mixture was determined. The data of this series of tests are tabulated as follows:

| Percent Dihydroxymaleic | Gel Time In Seconds | Tank Life in Hours at— | |
|---|---|---|---|
| | | 100° F. | 77° F. |
| 0.03 | 194 | 0.5 | 1 |
| 0.06 | 133 | 0.5 | 1 |

The mixture was useful for casting and laminating and could be cured at temperatures in the range of about 70° F. to 250° F.

*Example VI*

The interpolymerizable mixture of this example was the same as that of Example V, except that dihydroxymaleic acid was replaced by ethyl dihydroxymaleate. The series of tests conducted upon this material corresponded to those of Example V. The data of the tests are tabulated as follows:

| Percent Dihydroxymaleate | Gel Time in Seconds | Tank Life in Hours at 100° F. |
|---|---|---|
| 0.015 | 184 | 0.75 |
| 0.03 | 126 | 0.5 |
| 0.06 | 76 | 0.3 |

The mixture was susceptible of use in forming valuable castings and laminates. The curing range was about 70° F. to 250° F.

*Example VII*

This example is similar to Example V, except tertiary butyl hydroperoxide in an amount of 1 percent by weight based upon the mixture was employed as the catalyst. The series of tests was similar to that conducted upon the material in Example V and the results thereof are tabulated as follows:

| Percent Dihydroxymaleic | Gel Time In Seconds | Tank Life in Hours at 100° F. |
|---|---|---|
| 0.03 | 175 | 0.25 |
| 0.06 | 85 | 0.12 |

The mixtures were useful in forming casting and laminations of many types.

*Example VIII*

The polyester-monomer mixture of this example comprised a polyester of propylene glycol and equal moles of phthalic acid and maleic acid. The polyester in an amount of 2 parts by weight was mixed while hot, with 1 part by weight of styrene, the mixture being stabilized with 0.1 percent by weight based upon the mixture of trimethyl benzyl ammonium chloride and 0.001 percent by weight based upon the mixture of quinone.

To this mixture was added 2 percent by weight of catalyst, namely benzoyl peroxide and 0.01 percent by weight based upon the mixture of dihydroxymaleic acid. The gel time was 6 mintues at 77° F. A 50 gram mass of the mixture cured to a hard solid resinous casting without extraneous heat.

A similar sample in which dihydroxymaleic acid was replaced by ascorbic acid had a gel time of 13 minutes.

*Example IX*

The polyester and monomer mixture of this example was the same as in Example VIII except that quinone was replaced by 0.0025 percent based upon the polyester components of hydroquinone. The latter was actually cooked into the batch.

The polyester-monomer mixture was catalyzed with 4 percent by weight of benzoyl peroxide and 0.02 percent by weight of dihydroxymaleic acid. The gel time at 77° F. was 32 minutes. The mixture polymerized to form a hard, durable casting.

*Example X*

The polyester in this example comprised 1 mole of maleic acid, 1.5 moles of phthalic acid and 2.8 moles of propylene glycol. The polyester was mixed with styrene to provide a mixture:

| | Percent by weight |
|---|---|
| Polyester | 62 |
| Styrene | 38 |

The mixture was stabilized with 0.025 percent by weight based upon the polyester of tertiary butyl catechol. This mixture was catalyzed with 0.025 percent by weight based upon the mixture of cobalt naphthenate, 4 percent by weight based upon the mixture of benzoyl peroxide and 0.02 percent upon a like basis of dihydroxymaleic acid. The mixture had a gel time at 77° F. of 36 minutes and a 50 gram sample cured without heating to a hard resinous casting.

*Example XI*

The polyester of this example comprised 8 moles of diethylene glycol, 3 moles of propylene glycol, 7.5 moles of maleic acid and 2.5 moles of phthalic acid. (The term acid includes the anhydrides.) The mixture was stabilized for storage with 0.0018 percent based upon the polyester components of hydroquinone. The mixture was catalyzed with 2 percent based upon the mixture of benzoyl peroxide and 0.02 percent by weight by dihydroxymaleic acid. The mixture had a gel time of 30 minutes at 77° F. and cured without extraneous heat to form a solid casting of 50 grams weight.

From the foregoing tests, it is apparent that dihydroxymaleic acid and its esters powerfully activate or accelerate the action of free radical initiators in the curing of interpolymerizable mixtures of monomers containing $>C=CH_2$ groups and polyesters of alpha-beta ethylenic dicarboxylic acids.

The interpolymerizable mixtures containing dihydroxymaleic acid or its ethyl ester as disclosed in the several examples, I through XI, each is a valuable interpolymerizable mixture which when heated to a temperature within a range extending from about room temperature up to about 260° C. will very rapidly cure to a hard, thermoset state. The mixtures can be employed as casting resins for forming objects of art or embedments of various materials, such as biological specimens, keepsakes, and the like. They may also be applied to mats and fabrics of glass fibers or other fibrous materials and cured quickly to a hard, thermoset state.

In the Examples I through XI, the polyesters of propylene glycol, mixed fumaric acid and phthalic acid (equal moles of each acid) may be used. The proportions of the phthalic acid may be increased or decreased in a wide range from 0.25 to 10 moles per mole of alphabeta ethylenic dicarboxylic acid. Also, the polyesters may be of diethylene glycol and being represented by diethylene maleate-phthalate, or diethylene fumarate phthalate. Phthalic acid can be replaced by adipic or sebacic acids or other non-ethylenic dicarboxylic acids.

In the examples, styrene as the monomer can be replaced by vinyltoluene, acrylonitrile and other monomers containing a $>C=CH_2$ group attached to a negative radical.

The forms of the invention as herein disclosed are by way of illustration. It will be apparent to those skilled in the art that numerous modifications may be made therein without departure from the spirit of the invention or the scope of the appended claims.

We claim:

1. A method of interpolymerizing a mixture of a monomer containing a $>C=CH_2$ group and a polyester of a dihydric alcohol and an alpha-beta ethylenic dicarboxylic acid, which comprises adding to said mixture a material of a class consisting of dihydroxymaleic acid and an ester thereof with a saturated monohydric aliphatic alcohol containing 1 to 6 carbon atoms in an amount to effect interpolymerization of said mixture and heating the mixture.

2. A method of interpolymerizing a mixture of a monomer containing a $>C=CH_2$ group and a polyester of a dihydric alcohol and an alpha-beta ethylenic dicarboxylic acid, which comprises heating a mixture of the same in the presence of dihydroxymaleic acid.

3. A method of interpolymerizing a mixture of a monomer containing a $>C=CH_2$ group and a polyester of a dihydric alcohol and an alpha-beta ethylenic dicarboxylic acid, which comprises heating said mixture in the presence of an ester of dihydroxymaleic acid and a saturated monohydric aliphatic alcohol containing from 1 to 6 carbon atoms, the ester being present in an amount to catalyze the interpolymerization reaction.

4. A method as defined in claim 3 in which the ester of dihydroxymaleic acid is the ethyl ester.

5. A method of interpolymerizing a mixture of a monomer containing a $>C=CH_2$ group, a polyester of a dihydric alcohol and a mixture of two dicarboxylic acids, one of which is alpha-beta ethylenic and the other of which is a saturated acid, which comprises heating the mixture in the presence of a material of a class consisting of dihydroxymaleic acid and an ester thereof with a saturated monohydric aliphatic alcohol containing 1 to 6 carbon atoms and in an amount to effect interpolymerization of said mixture.

6. A method of interpolymerizing a mixture of a monomer containing a $>C=CH_2$ group and a polyester of a dihydric alcohol and a mixture of dicarboxylic acids, one of which is alpha-beta ethylenic and another of which is phthalic acid, which comprises heating said mixture in the presence of a free radical initiator of polymerization and a material of a class consisting of dihydroxymaleic acid and an ester of the same with a saturated monohydric aliphatic alcohol containing 1 to 6 carbon atoms and in an amount to effect interpolymerization thereof.

7. A method as defined in claim 6 in which the free radical initiator of polymerization is peroxidic.

8. In a method of interpolymerizing a mixture of a monomer containing a $>C=CH_2$ group and a polyester of a dihydric alcohol and a mixture of a plurality of dicarboxylic acids, one of which is alpha-beta ethylenic and in another of which the carbon to carbon bonds are of a class consisting of single bonds and benzenoid double bonds, the steps which comprise incorporating with the mixture dihydroxymaleic acid and heating the mixture.

9. The steps of claim 8 in which the dihydroxymaleic acid is further accompanied by a free radical polymerization initiator.

No references cited.